UNITED STATES PATENT OFFICE.

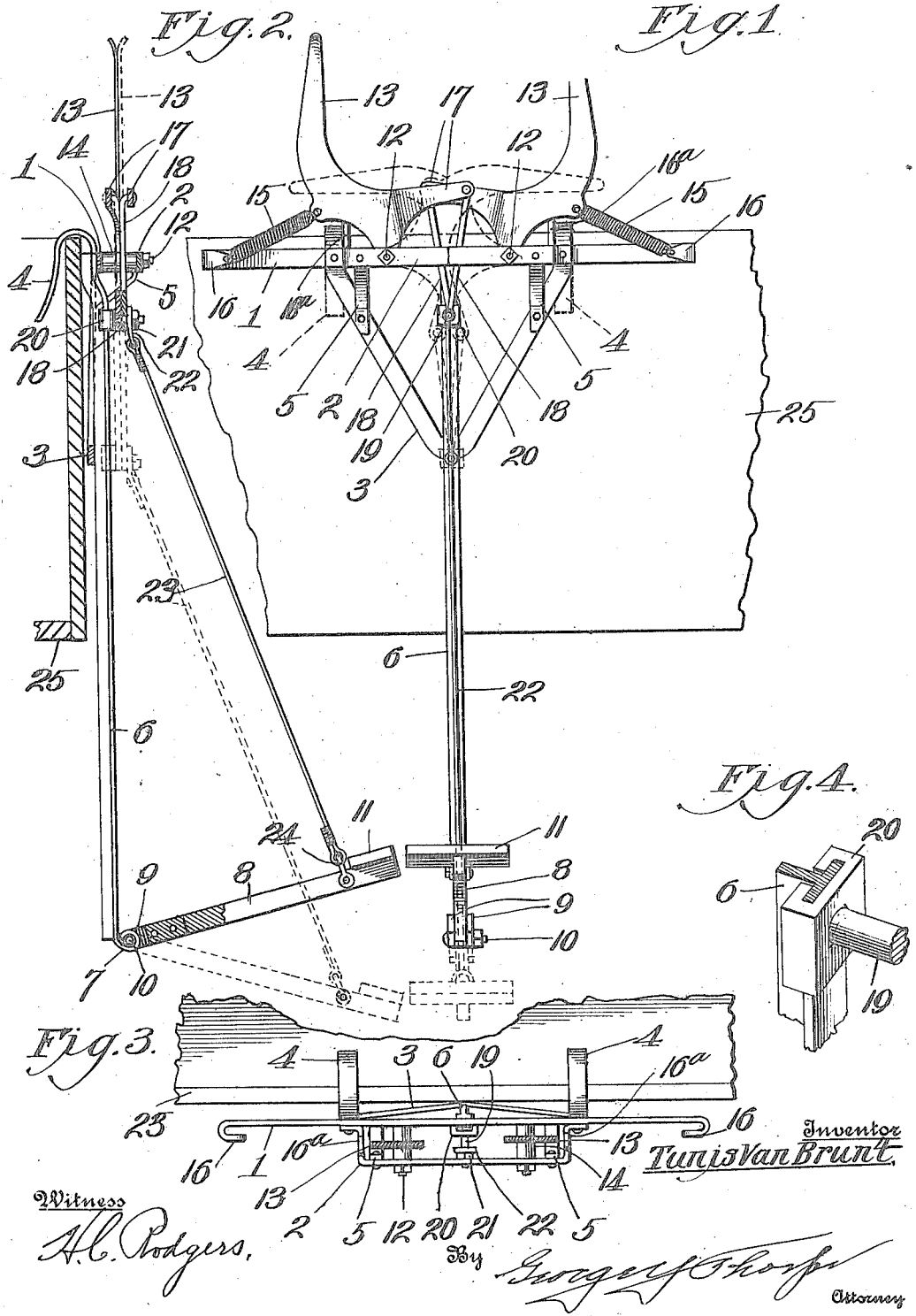

TUNIS VAN BRUNT, OF KANSAS CITY, MISSOURI.

BUNDLE-TOPPER.

1,269,761.

Specification of Letters Patent.    Patented June 18, 1918.

Application filed January 8, 1916.   Serial No. 71,105.

*To all whom it may concern:*

Be it known that I, TUNIS VAN BRUNT, a citizen of the United States, residing at Kansas City, in the county of Jackson and State of Missouri, have invented certain new and useful Improvements in Bundle-Toppers, of which the following is a specification.

This invention relates to bundle toppers and has for its object to produce a device by which bundles of Kafir corn and the like can be conveniently and quickly topped in the field where such bundles were shocked. A further object is to produce a device of this character which can be instantly attached to the side of a wagon box so that when operated the heads of the bundles shall fall into the box and the stalks may be tossed back upon the field or reshocked if necessary.

Another object is to produce a device of this character by which the topping operation can be performed by a single attendant.

With these objects in view, and others as hereinafter appear the invention consists in certain novel and peculiar features of construction and organization as hereinafter described and claimed; and in order that it may be fully understood reference is to be had to the accompanying drawing, in which—

Figure 1, is a side elevation of a device embodying my invention applied in operative position to the side of a wagon box.

Fig. 2, is a central vertical section of the same.

Fig. 3, is a top plan view of the device as shown in Fig. 1, but with the topping blades, their springs and the treadle or foot lever omitted.

Fig. 4, is an enlarged detail perspective view of a sliding sleeve forming a part of the device.

In the said drawing, 1 is a horizontal bar and 2 is a U-shaped bar secured at its ends to bar 1 at opposite sides of and equal distances from the center of the same, the two bars thus constituting a frame provided with an elongated opening.

3 is a V-shaped bracket secured near its upper ends in downwardly-disposed hooks 4, the same constituting hangers by which the device can be suspended from a wagon box as hereinafter more particularly referred to.

5 is a pair of inclined braces secured at their opposite ends to the U-bar 2 and the V-shaped bracket, so as to secure said parts together in rigid relation.

6 is a vertical guide bar depending from the center of the bar 1 to which it is rigidly secured in any suitable manner and said guide bar is provided at its lower end with a loop or eye 7 to form a pivotal support for a foot lever or treadle 8, the connection being preferably made by a pair of plates 9 secured to the lever or treadle which is preferably of wood, and a pivot bolt 10 extending through said plates and the loop or eye 7 and secured upon the outer end of the lever is a foot piece 11.

12 is a pair of horizontal pivot bolts extending across the opening of the frame and forming a pivot support for the substantially right-angle shaped cutters or blades 13, the same having lateral enlargements or hubs 14, upon the pivot bolts 12 to steady the cutters in their operation. The cutters are offset slightly as will be seen most clearly in Figs. 2 and 3, and their inner or adjacent faces are coincidental with their cutting edges.

15 are retractile springs secured to the cutters or blades and the front ends 16 of the bar 1 for the purpose of normally holding the cutters in open position as shown in full lines Fig. 1, and to limit the opening movement of the cutters, stops 16$^a$ are provided, the same being shown as extending upward from the ends of the U-shaped bar.

The inner ends of the cutters or blades are formed with spaced arms 17, and pivoted to said arms at the inner sides of the same by preference, are links 18 pivotally mounted at their lower ends on the pivot pin 19 projecting from a sliding sleeve 20 mounted upon the guide 6.

A nut 21 engages the outer end of the pin, and interposed between the nut and the foremost link 18 is a link 22 pivotally connected at 23 to the clevis 24 pivoted to the foot lever or treadle 8.

The wagon box upon which the device is hung is indicated at 25.

In operation the attendant grasps the bundle to be topped and holding it in a substantially horizontal position between the cutters or blades, with its head portion overhanging the wagon box, applies pressure with his foot upon the foot piece 11 and then causes the lever or treadle to swing downward as indicated by dotted lines and, through the connection with the sliding sleeve 20, swings the cutters or blades to the position indicated by dotted lines Fig. 1.

In this action the inner or cutting edges of the blades pass each other and thus cut through all of the stalks of the bundle. If the stalks are very tough or the knives of the cutters a little dull, the operator may have to effect the operation of the treadle repeatedly before he can depress it the full distance to effect the severance of all of the stalks, but the heading operation whether performed by the application of pressure but once or several times on the foot piece, can be expeditiously effected and as soon as pressure is removed from the foot lever, the springs 15 effect the reopening or return of the cutters to normal position.

With a device of this character it will be seen that the operation of topping bundles can be performed very economically as it avoids the necessity of hauling the stalks to and from the place of operation and it is even more desirable than a topper which removes the heads from stalks standing in the field.

From the above description it will be apparent that I have produced a bundle topper possessing the features of advantage enumerated as desirable in the statement of the object of the invention, and I wish it to be understood that while I have illustrated and described what now appears to me to be the preferred embodiment of the invention I reserve the right to make all changes falling within the spirit and scope of the appended claim.

I claim:—

A bundle topper, comprising a suitable frame, a pair of blades pivoted to said frame at suitable distances apart and of angular form to provide a relatively wide space between a pair of their arms and an overlapping relation between their other pair of arms, a support adjacent the plane of the pivotal points of the blades to provide a resistance for a bundle while being cut by the blades, yielding means for holding the blades in open position, and means for effecting simultaneous pivotal operation of the said blades to cause them to perform their cutting function.

In testimony whereof, I affix my signature, in the presence of a witness.

TUNIS VAN BRUNT.

Witness:
G. Y. THORPE.

Copies of this patent may be obtained for five cents each, by addressing the "Commissioner of Patents, Washington, D. C."